No. 813,905. PATENTED FEB. 27, 1906
C. S. LOCKWOOD.
AUTOMOBILE WHEEL BEARING.
APPLICATION FILED MAY 6, 1903. RENEWED AUG. 1, 1905.

3 SHEETS—SHEET 1.

Attest:
L. Lee.
Arthur T. Heaton

Inventor.
Charles S. Lockwood,
per Thomas S. Crane, Atty

No. 813,905. PATENTED FEB. 27, 1906.
C. S. LOCKWOOD.
AUTOMOBILE WHEEL BEARING.
APPLICATION FILED MAY 6, 1903. RENEWED AUG. 1, 1905.

3 SHEETS—SHEET 2.

Attest:
L. Lee.
Arthur T. Heaton

Inventor.
Charles S. Lockwood,
per Thos. S. Crane, Atty.

No. 813,905. PATENTED FEB. 27, 1906.
C. S. LOCKWOOD.
AUTOMOBILE WHEEL BEARING.
APPLICATION FILED MAY 6, 1903. RENEWED AUG. 1, 1905.

3 SHEETS—SHEET 3.

Attest:
L. Lee.
Arthur T. Heaton

Inventor
Charles S. Lockwood,
per Thomas S. Crane, Atty.

UNITED STATES PATENT OFFICE.

CHARLES S. LOCKWOOD, OF NEWARK, NEW JERSEY, ASSIGNOR TO HYATT ROLLER BEARING COMPANY, OF HARRISON, NEW JERSEY, A CORPORATION OF NEW JERSEY.

AUTOMOBILE-WHEEL BEARING.

No. 813,905.      Specification of Letters Patent.      Patented Feb. 27, 1906.

Application filed May 6, 1903. Renewed August 1, 1905. Serial No. 272,195.

*To all whom it may concern:*

Be it known that I, CHARLES S. LOCKWOOD, a citizen of the United States, and a resident of 289 Market street, Newark, county of Essex, State of New Jersey, have invented certain new and useful Improvements in Automobile-Wheel Bearings, fully described and represented in the following specification and the accompanying drawings, forming a part of the same.

The present invention comprises a wheel-hub having a shell with cylindrical bore and keyway and screw-threaded space at each end of the bore and flanges upon the shell for supporting the spokes, a journal having a double cone tapered toward opposite ends, two sets of taper rolls between the double cone and sleeves, and screw-collars fitted to the threaded spaces for adjusting the sleeves to the rolls. The double cone may be locked upon the journal by clamping between end shoulders, in which case the wheel-hub is held from longitudinal motion by the opposed conical faces which bear upon the rolls, or the shell may be provided at opposite ends with heads independent of the adjusting-collars and the bearing provided with a collar and nut adjusted to such heads. The collar and nut thus resist the end thrust, and the double cone in such case may be fitted movably to a feather upon the journal, so as to adjust itself longitudinally to a suitable working position between the rolls. Both constructions are shown in the annexed drawings, in which—

Figure 2:
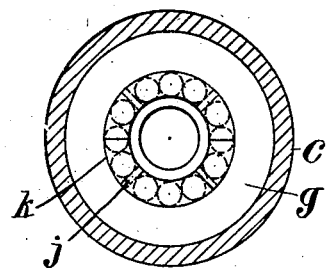
Figure 1:
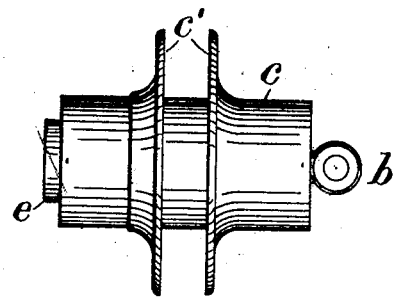
Figure 3:
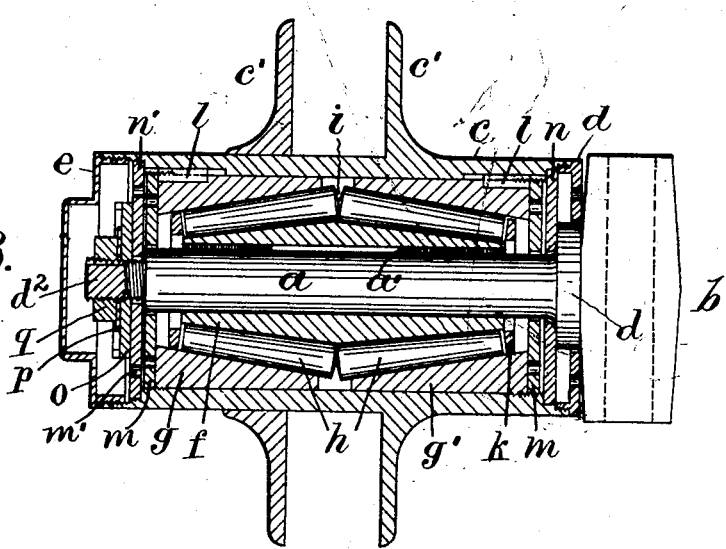
Figure 4:
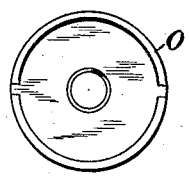
Figure 5:
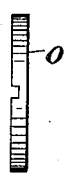
Figures 6, 7:
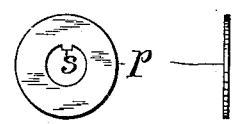
Figure 8:
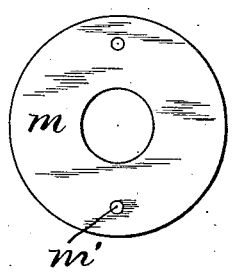
Figure 9:
Figure 10:
Figure 11:
Figure 12:
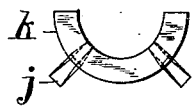
Figure 14:
Figure 15:
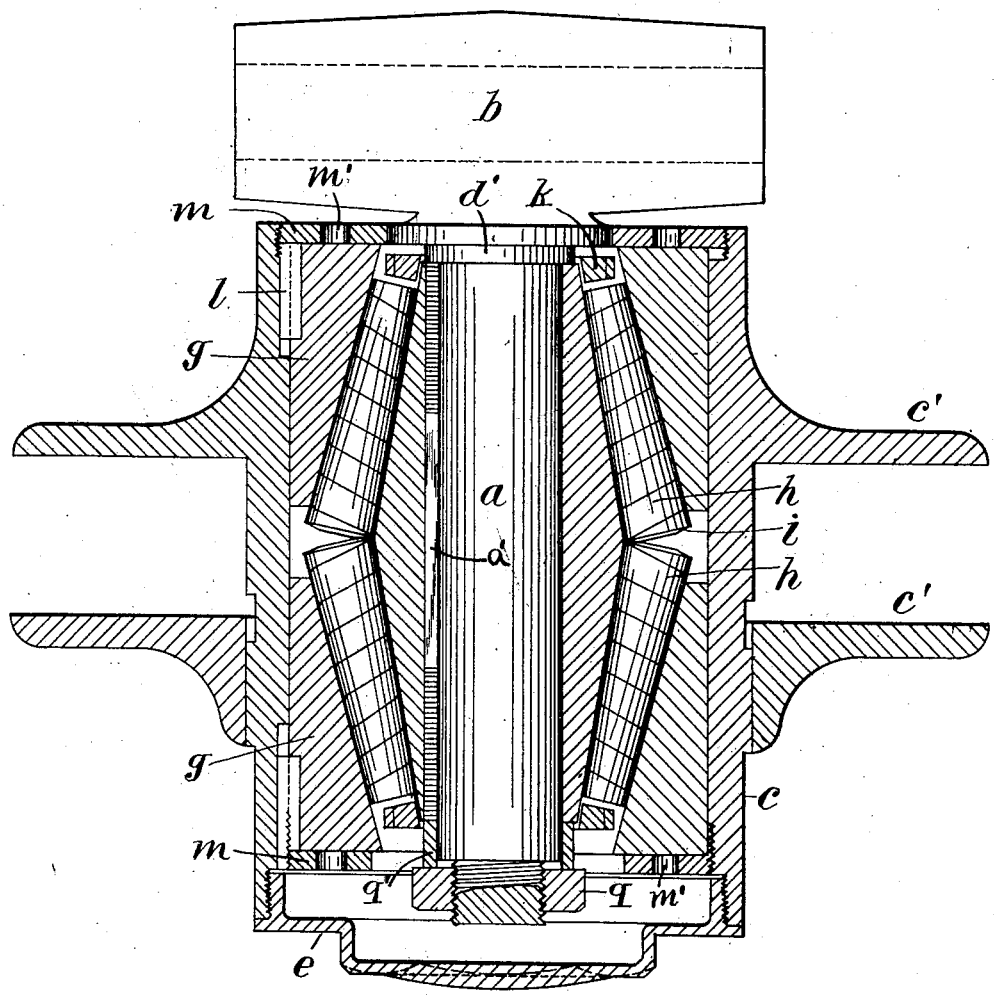

Figure 1 is a plan of the wheel-hub with the socket at the inner end of the journal by which it is jointed to the vehicle-axle for the purpose of steering. Fig. 2 is an end view of the hub and wheel-bearing with the hub in section at the end of the sleeve $g$. Fig. 3 is a vertical longitudinal section of the wheel-bearing. Fig. 4 is an end view, and Fig. 5 an edge view, of the adjusting-nut for the journal. Fig. 6 is an end view, and Fig. 7 an edge view, of the washer for the same. Fig. 8 is an end view, and Fig. 9 an edge view, of the head $m$. Fig. 10 shows the double cone detached from the journal. Fig. 11 shows one of the antifriction-rolls. Fig. 12 is an end view, Fig. 13 a plan, and Fig. 14 an edge view, of one of the roller-guides. Fig. 15 is a longitudinal section of the wheel-bearing slightly modified. Fig. 3 shows the double cone splined upon the journal to adjust itself longitudinally, while Fig. 15 shows the cone clamped upon the journal and the hub self-adjusting thereto.

Figure 13:

In Fig. 3, $a$ designates the journal; $b$, the socket at right angles to the inner end of the journal for jointing it upon the axle. $c$ is the shell of the wheel-hub, shown with flanges $c'$ to embrace the spokes or disk of the wheel. $d$ is a cap screwed into the inner end of the hub $c$ around the inner collar $d'$ of the journal. The outer end of the journal $a$ is formed with a shoulder and with threaded extension $d^2$ to receive the nut $q$. $e$ designates a head screwed upon the outer end of the hub to close the same. $f$ designates the double cone tapered from the middle toward its ends and fitted to the journal $a$ by means of a feather $a'$, so that it can move longitudinally when required. $g\ g'$ designate the sleeves tapered correspondingly to the double cone, at a slightly greater angle, to admit the antifriction-rolls $h$, which are tapered proportionately to the double cone and sleeves. The inner ends $i$ of the rolls contact with one another and are of such conical shape and proportions, as shown in Figs. 3 and 11, that they roll upon one another with very little friction when pressed together by the operation of the bearing. The sleeves, the rolls, and double cone all roll upon one another without slippage. The enlargement of the rolls at their inner ends tends to make them slip endwise toward one another between the surfaces of the double cone and sleeves, and such tendency is resisted with very little friction by the rolling contact of the opposed ends of the rolls. Feathers $l$ are fitted to keyways in the sleeves and shell to keep the sleeves from rotation. To adjust the sleeves to the outer surfaces of the rolls and to compensate for wear of the supporting-surfaces, collars $m$ are screwed into the ends of the shell in contact with the shells, and such collars are bored to clear the journal $a$, so that there is no tendency for them to turn or lose their adjustment. Holes $m'$ (shown in Fig. 8) serve to apply a spanner for turning the collars when required. To furnish longitudinal shoulders for the hub upon the journal, a collar $d'$ is provided at one end, and at the other a clamp-nut $o$ is fitted to a threaded extension $d^2$ of the journal, and heads $n$ $n'$ are fitted to shoulders within the ends of the shell to resist the thrust upon these parts. The clamp-nut $o$ is shown in Figs. 4 and 5 provided with a notched flange for turning it when required, and a lock-nut $q$ is provided to jam upon such clamp-nut and hold it from displacement when adjusted. To prevent the rotation of the head $n'$ from turning the clamp-nut, a washer $p$ is fitted between the clamp-nut and lock-nut to prevent the nuts from turning in a manner well known and provided with a tongue $s$, fitted to a key-seat in the threaded end $a^2$, and such washer is thus held from turning and prevents the clamp-nut from producing any tendency to turn the lock-nut. The double cone $f$ is fitted to the feather $a'$ upon the journal $a$, so as to adjust itself longitudinally between the rolls and sleeves, so as to produce an equal pressure upon both sets of rolls. To preserve the integrity of the inner ends of the rolls which are designed to contact with and roll upon one another, the rolls are not mounted upon pivots, but are guided, as is common in roller-bearings, by means of a plurality of guide-bars inserted between groups of the rolls and connected at their opposite ends by arches adapted to encircle or clear the journal. Such a guide-yoke is shown in Figs. 12 to 14, with the guide-bars $j$ connected by the semicircular arches $k$, and Fig. 2 shows two of such guide-yokes applied to opposite sides of the journal to sustain four of the guide-bars $j$ at equidistant points between the rolls. Such guide-bars are expanded or bent obtusely at the middle of their length to clear the enlarged central portion of the double cone, and although the guide-bars are thus farther apart at the middle than at the ends they are found in practice to guide the rolls satisfactorily and to prevent them from assuming any oblique position, which would cause them to grind and chafe violently against the shell and cone. Shoulders are shown in the shell $c$ adjacent to the ends of the screw-threaded spaces which receive the collars $m$, and the heads $n$ $n'$ are fitted to such shoulders, so as to receive the end thrust of the journal independently of the screw-collars $m$, which adjust the sleeves, and when any lateral bearing of the rolls upon the double cone arises the double cone slips automatically upon the feather $a'$ to restore the equilibrium of pressure in the two sets of rolls.

In Fig. 15 the hub is shown without any heads and is not restrained from end movement upon the journal except by the fitting of the rolls between the cone and sleeves. The double cone is shown in contact at its inner end with the collar $d'$ upon the journal and at its outer end in contact with a bushing $q'$, which extends through the collar $m$ to contact with the nut $q$, and the cone is thus clamped rigidly upon the journal. The cone is secured upon the journal by a feather $a'$. As the double cone cannot move upon the journal, the wheel-hub automatically adjusts itself upon the double cone until an equal pressure upon both sets of rolls is secured, when the collar $m$ is adjusted. In Fig. 15 rolls are shown formed of spiral coils, as is common in many roller-bearings.

The chief difference between the constructions of Figs. 3 and 15 is that the end thrust in Fig. 3 is supported by the heads $n$ $n'$ and the double cone is movable longitudinally upon the journal to secure an equal bearing upon the rolls $h$, while in Fig. 15 the double cone is clamped rigidly against the shoulder $d'$ by the nut $q$ and the end thrust is sustained directly by the collars $m$, which support and adjust the sleeves $g$.

Having thus set forth the invention, what is claimed herein is—

1. A wheel-hub having the shell $c$ with cylindrical bore, and a keyway and screw-threaded space at each end of the bore, and flanges $c'$ for supporting the spokes, the journal $a$, having a double cone $f$ tapered toward opposite ends, the tapered sleeves $g$, $g'$, fitted adjustably to the bore and having feathers $l$ fitted movably to the keyways, the screw-collars $m$ fitted to the threaded spaces for adjusting the sleeves, and rolls fitted between such double cone and sleeves and tapered in the same ratio as the cone and sleeve.

2. A wheel-hub having the shell $c$ with cylindrical bore, and keyway and screw-threaded space at each end of the bore, and flanges $c'$ for supporting the spokes, the journal $a$ the double cone $f$ thereon tapered toward opposite ends, the tapered sleeves $g$, $g'$, fitted adjustably to the bore the feathers $l$ in the sleeves fitted movably to the keyways, the screw-collars $m$ fitted to the threaded spaces for adjusting the sleeves, rolls fitted between such double cone and sleeves, the heads $n$, $n'$ fitted to shoulders within the ends of the shell $c$ to support the end thrust independently of the adjusting-collars, and the said journal having a collar at one end and adjustable nut at the other for adjustment to such heads.

3. A wheel-hub having the shell $c$ with cylindrical bore, and keyway and screw-threaded space at each end of the bore, and flanges $c'$ for supporting the spokes, the journal $a$, the double cone $f$ thereon tapered toward opposite ends, the tapered sleeves $g$, $g'$, fitted adjustably to the bore the feathers $l$ fitted movably to the keyways, the screw-collars $m$ in the sleeves fitted to the threaded spaces for adjusting the sleeves, rolls fitted between such double cone and sleeves, the heads $n$, $n'$, fitted to shoulders within the ends of the shell $c$ to support the end thrust independently of the adjusting-collars, the screw-cap $d$ operating to clamp the head $n$ rigidly against a shoulder within the shell, and the head $n'$ being clamped to a shoulder within the opposite end of the shell, and the said journal having a collar at one end and nut at the other for adjustment to such heads.

In testimony whereof I have hereunto set my hand in the presence of two subscribing witnesses.

CHARLES S. LOCKWOOD.

Witnesses:
 LEAVITT MEISEREAU,
 THOMAS S. CRANE.